Figure 2:
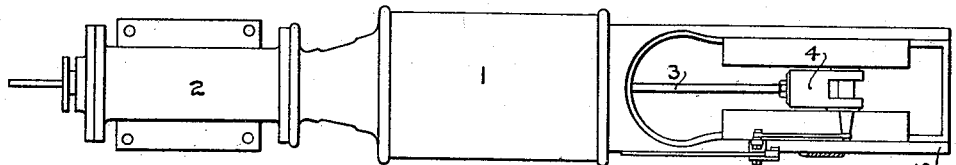

J. W. BROWN.
BRAKE OPERATING DEVICE.
APPLICATION FILED FEB. 15, 1911.

1,124,998.

Patented Jan. 12, 1915.

2 SHEETS—SHEET 1.

WITNESSES.
W. H. Lieber
Ella Brickell

J. W. Brown INVENTOR.

BY

ATTORNEY.

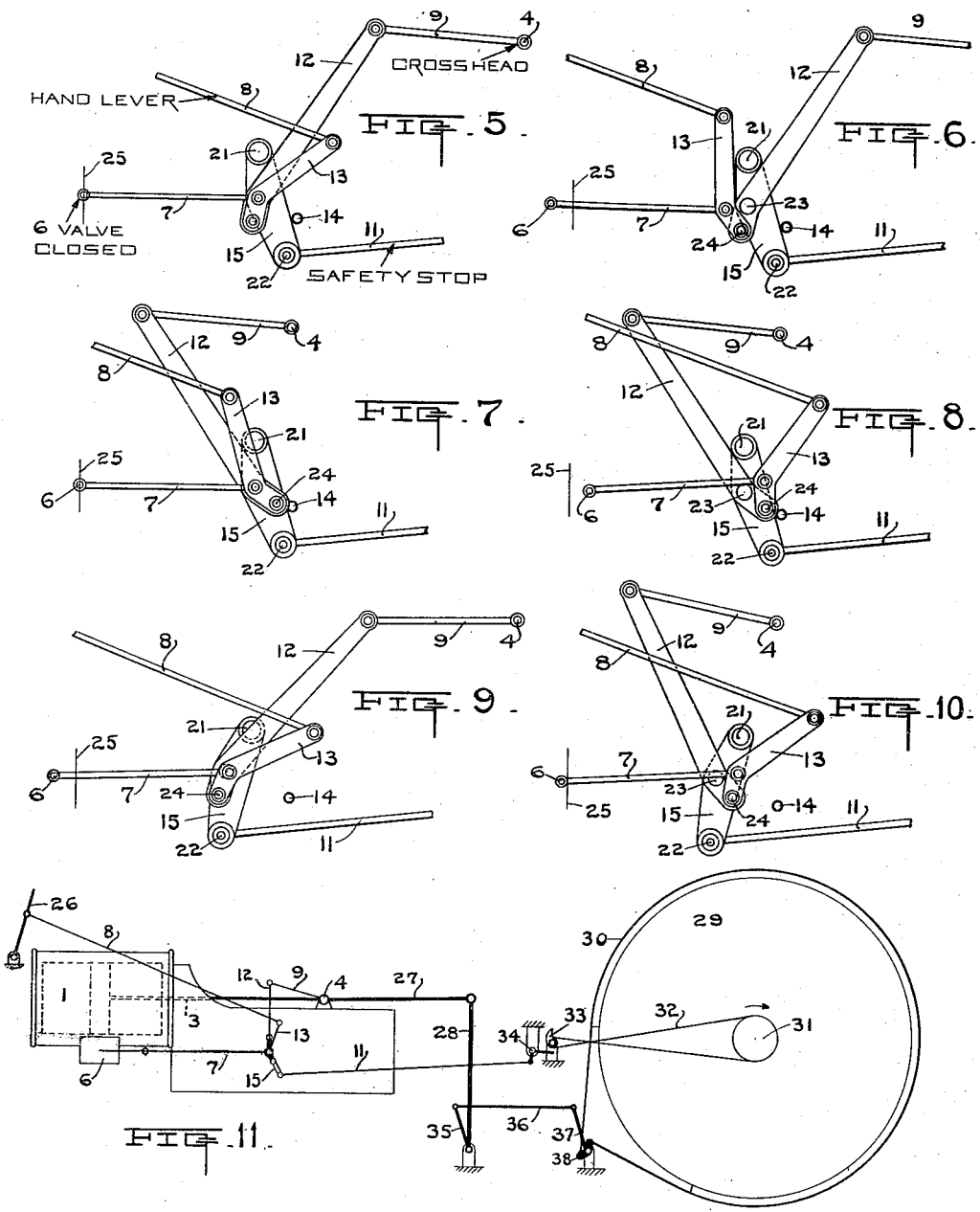

UNITED STATES PATENT OFFICE.

JOHN W. BROWN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

BRAKE-OPERATING DEVICE.

1,124,998.        Specification of Letters Patent.        Patented Jan. 12, 1915.

Application filed February 15, 1911. Serial No. 608,646.

*To all whom it may concern:*

Be it known that I, JOHN W. BROWN, a citizen of the United States, residing at Milwaukee, West Allis, in the county of Milwaukee and State of Wisconsin, have invented a certain new and useful Improvement in Brake-Operating Devices, of which the following is a specification.

This invention relates to improvements in the construction of brake operating devices for hoists, and particularly to safety devices for causing the brake engine to automatically set the brake in case the hoisting skip travels beyond a desired level.

The object of the invention is to provide a brake engine for hoists which is simple in construction, efficient in operation, and which will automatically set the brakes to prevent over-travel of the drum or skip.

A clear conception of one embodiment of the invention can be obtained by referring to the accompanying drawings in which like reference characters designate the same or similar parts in the various views.

Figure 1:
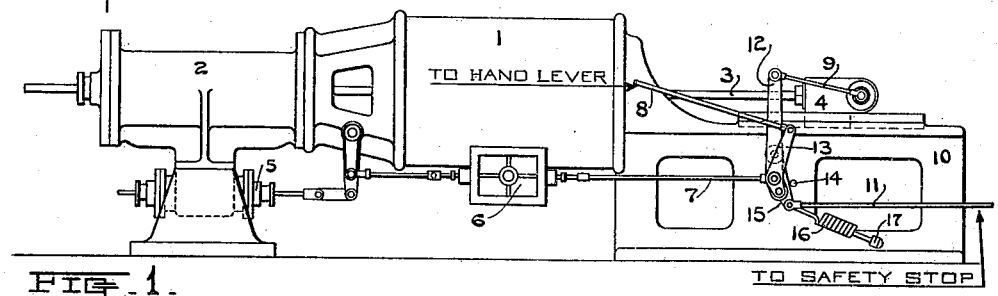
Figure 3:
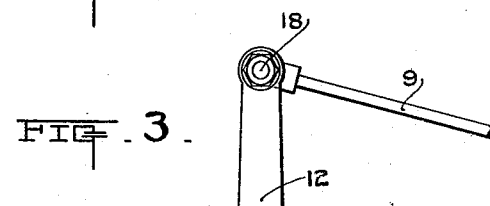
Figure 4:
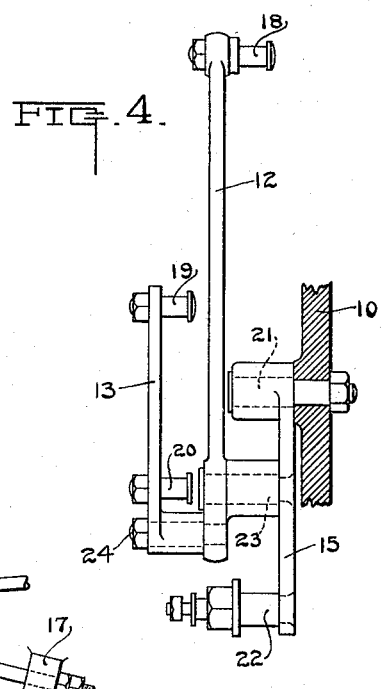

Figure 1 is an elevation of a brake engine looking toward the valve gear side thereof. Fig. 2 is a plan of the brake engine. Fig. 3 is an elevation of the valve operating levers and connections, the device being shown in central or mid position. Fig. 4 is an end view of the mechanism shown in Fig. 3. Fig. 5 is a diagrammatic elevation of the valve operating levers and connections in the position in which the brake is released. Fig. 6 is an elevation of the valve operating levers and connections with the hand lever pulled into setting position. Fig. 7 is an elevation of the valve operating levers and connections in the position in which the brake is set. Fig. 8 is an elevation of the valve operating levers and connections with the hand lever in the position in which the brake is released. Fig. 9 is an elevation of the valve operating levers and connections in the position in which the safety device is sprung and the brake is released. Fig. 10 is an elevation of the valve operating levers and connections in the position in which the safety device is sprung and the brake is set. Fig. 11 is a diagrammatic elevation showing the brake engine, brake, and safety device applied to the drum of a hoisting engine.

The brake engine, see Figs. 1 and 2, consists essentially of a steam cylinder 1 and oil cylinder 2, in tandem. The steam cylinder 1 is provided in the usual manner with a reciprocating piston on either end of which the valve 6 is adapted to admit steam. The oil cylinder 2 is also provided in the usual manner, with a piston on either end of which the valve 5 is adapted to admit oil. The piston rod 3 of the steam piston is provided with a cross-head 4 which rests upon the engine frame 10 and is adapted to be reciprocated thereon by the movement of the steam piston within the cylinder 1. The crosshead 4, see Figs. 1, 2 and 11, is connected to the upper end of the lever 28 by a connection 27. The bell crank 35, see Fig. 11, is adapted to be oscillated by the lever 28 and has its outer end connected with the other end of a second bell crank by means of a horizontal connection 36. The bell crank 37 is formed in one with the brake cranks 38, to the outer ends of which the ends of the brake strap 30 are secured. The brake strap 30, of which there may be one at each end of the drum, coacts with the end of the drum 29 and may be released or tightened by swinging the bell crank 37 toward or away from the brake engine, respectively.

The safety lever 15, see Figs. 1, 2, 3 and 4, is mounted upon a pivot pin 21 which is fixed to the brake engine frame 10. The lever 15 is normally held in forward position, that is, in coaction with a stop 14, by means of a helical spring 16. The spring 16 has its one end secured to the pin 22, its opposite end being fixed to a lug 17 formed integral with the frame 10. The safety stop connection 11 connects the pin 22 at the lower end of the safety lever 15 with any of the well known safety devices used to prevent over-travel of the hoisting skip. As shown, see Fig. 11, the safety stop connection 11 connects with a short bell crank mounted on the shaft 34. This bell crank has an arm which projects horizontally toward the hoisting drum 29. This horizontal arm is located in the path of a rotatable, laterally movable cam 33 adapted by its lateral travel to be brought into contact with the cam 33 only at the danger limits or when the hoisting skip is about to over-travel. The cam 33 is given rotation from the drum 29 by means of a belt 32 coacting with a pulley 31 mounted concentrically with the drum 29 and taking over a small pulley mounted on a screw shaft on which the cam is adapted to travel. The cam travels laterally along the screw shaft being guided laterally and prevented from turning on said screw by guides parallel to the screw.

The crosshead lever 12 is mounted upon the pivot pin 23 which is fixed to the safety lever 15 at a point intermediate the ends thereof. The pin 18 at the upper end of the lever 12 is connected with the crosshead 4 by means of the crosshead connection 9. The valve lever 13 is mounted at its lower end upon a pivot pin 24 which is fixed to the lower end of the crosshead lever 12. The hand lever 26, see Fig. 11, is connected with the pin 19 at the upper end of the valve lever 13 by means of the hand lever connection 8. The valve 6 is connected with the pin 20 at the mid portion of the valve lever 13 by means of the valve connection 7.

During the normal operation of the hoist and with the brakes in release position, the valve operating levers and connections are in the position shown in Fig. 5, the hand lever connection 8 being thrown forward and the valve 6 being closed. In order to set the brake, the hand lever 26 is pulled in a direction away from the drum 29, the valve lever 13, as a result of such rearward motion of the hand lever 26 assuming the position shown in Fig. 6, and the valve 6 being opened. The line 25 represents mid or closed position of the valve 6, and it will be seen by referring to Fig. 6 that in pulling the hand lever 26 to brake set position, the valve 6 is moved to the left of the line 25, this movement of the valve admitting steam to the chamber at the right of the piston in the cylinder 1. The steam admitted to the right piston chamber causes the piston to move toward the left, carrying with it the piston rod 3, crosshead 4, connection 27, and swinging about the pivot 19. This swinging of the lever 28 causes the bell cranks 35 and 37 to swing toward the left, thereby tightening the brake strap 30 and setting the brakes.

As the steam admitted to the right of the piston in the cylinder 1 forces the piston to the left, the lever 12 is swung about the pivot 23 and takes the position shown in Fig. 7. This swinging of the lever 12 is effected through rod 9 by the motion of the crosshead 4 to the left. The result of the swinging of the lever 12 about the pivot 23 is that the pivot 24 of the valve lever 13 is carried to the right, valve lever 13 in the meantime swinging about the pivot 19,. This swinging of the lever 13 causes the pivot 20 to be carried to the right, bringing the valve 6 back to closed position. The steam entrapped in the piston chamber to the right of the piston, holds the piston, piston rod 3, and crosshead 4 in temporarily fixed position. The oil in the oil cylinder 2, which during motion of the oil piston passes through a restricted opening from one side of the piston to the other, serves to hold these members in fixed position in case the steam should escape by leakage.

In releasing the brakes, the hand lever 26 through rod 8 causes the valve lever 13 to be swung to the right about the pivot pin 24 to the position shown in Fig. 8. This swinging of the valve lever 13 to the right causes the valve 6 to travel to the right of the center line 25, thus opening the valve and admitting steam to the left of the piston in the cylinder 1. With the admission of steam to the left of the piston, the piston rod 3, crosshead 4, and connection 27 are forced toward the drum 29, thereby releasing the brakes and eventually returning the valve operating levers and connections to the position shown in Fig. 5.

If, for any reason, the skip should approach its limiting position of travel, the cam 33, see Fig. 11, will approach the small bell crank on the shaft 34. As the limiting position is reached, the cam 33 which rotates in an anti-clockwise direction, rides upon the horizontal member of the small bell crank causing said crank to swing in a clockwise direction. This motion of the bell crank causes the safety lever 15 through the connection 11 to swing about the stationary pivot 21 to the position shown in Fig. 9, carrying with it the crosshead lever 12 and valve lever 13. The swinging of the safety lever 15 causes the valve 6 to move toward the left of the center line 25, thereby opening the valve 6 to admit steam into the right piston chamber. As the steam admitted to the right piston chamber forces the crosshead 4 to the left, the valve operating levers and connections take the brake set position shown in Fig. 10.

In order to restore the valve operating levers and connections to their normal position, it is necessary to reset the safety device. This is done by bringing the short bell crank which is mounted on the shaft 34 back to normal position, the spring 16 automatically bringing the safety lever 15 back against the stop 14.

It will be noted that the spring 16 has been omitted in Figs. 5, 6, 7, 8, 9, 10, and 11, this omission having been made since these figures are more or less diagrammatic and the insertion of detail would tend to complicate same. The brake levers and connections as shown in Fig. 11 are also shown diagrammatically and would be varied to fit conditions in actual construction. The valve ports and passages leading to the piston chambers have also been omitted as being well known to persons skilled in the art and forming no part of the present invention.

It should be understood that it is not desired to be limited to the exact details of construction shown and described, for obvious modifications will occur to a person skilled in the art.

It is claimed and desired to secure by Letters Patent,—

1. In a brake operating device, a stationarily fulcrumed safety lever, a crosshead lever fulcrumed on said safety lever, a valve lever fulcrumed on said crosshead lever, a valve connected to said valve lever and adapted to be operated thereby, means for moving said valve lever to operate said valve, means for moving said crosshead lever to operate said valve and independent means for moving said safety lever to operate said valve in cases of emergency.

2. In a brake operating device, a brake operating rod, pressure actuated means for moving said rod to operate the brake, a valve for controlling the position of said rod moving means, a normally stationarily fulcrumed lever connected with said rod for moving said valve, a floating lever connected with said valve and fulcrumed on said first mentioned lever, manually operable means connected to said floating lever for operating said valve, and means for automatically moving the fulcrum of said first mentioned lever to operate said valve.

3. In a brake operating device, a brake operating rod, means for moving said rod to operate the brake, a valve for controlling said rod moving means, a hand lever and a safety device for actuating said valve, two floating levers pivoted together, a third lever pivoted to one of said floating levers and at another point to a stationary support, connections from one of said floating levers to said valve and hand lever, a connection from the other of said floating levers to said brake operating rod, and a connection from said third lever to said safety device.

4. In a brake operating device, a brake operating rod, means for moving said rod to operate the brake, means for controlling the position of said rod moving means, a fulcrumed lever connected with said rod for moving said controlling means, a second lever connected with said controlling means and fulcrumed on said first mentioned lever, manually operable means connected to said second lever for operating said controlling means, and means for automatically moving the fulcrum of said first mentioned lever to operate said controlling means.

5. In a brake operating device, a brake operating rod, pressure actuated means for moving said rod to operate the brake, a valve for controlling the position of said rod moving means, a frame, a normally stationary lever fulcrumed on said frame, a second lever fulcrumed on said normally stationary lever and connected with said rod for moving said valve, a third lever connected with said valve and fulcrumed on said second lever, manually operable means connected to said third lever for operating said valve, and means for automatically moving said first mentioned lever whereby the fulcrum of said second lever is shifted to operate said valve.

In testimony whereof, I affix my signature in the presence of two witnesses.

JOHN W. BROWN.

Witnesses:
  CHAS. L. BYRON,
  W. H. LIEBER.

Copies of this patent may be obtained for five cents each, by addressing the " Commissioner of Patents, Washington, D. C."